United States Patent [19]

Horn et al.

[11] 4,302,551

[45] Nov. 24, 1981

[54] PROCESS FOR THE PREPARATION OF CELLULAR POLYMERS HAVING URETHANE GROUPS, ISOCYANURATE GROUPS, OR BOTH

[75] Inventors: Peter Horn, Hirschberg; Anton Hesse, Weinheim; Peter Weyland, Frankenthal; Wolfgang Straehle, Heidelberg; Matthias Marx, Bad Durkheim, all of Fed. Rep. of Germany

[73] Assignee: BASF Aktiengesellschaft, Ludwigshafen, Fed. Rep. of Germany

[21] Appl. No.: 218,483

[22] Filed: Dec. 22, 1980

[30] Foreign Application Priority Data

Jan. 17, 1980 [DE] Fed. Rep. of Germany ....... 3001462

[51] Int. Cl.$^3$ ............................................. C08G 18/14
[52] U.S. Cl. ..................................... 521/163; 521/164; 521/167; 521/172; 521/173; 521/174; 521/175; 521/176; 521/177
[58] Field of Search ............... 521/163, 164, 167, 172, 521/173, 174, 175, 176, 177; 252/182

[56] References Cited

U.S. PATENT DOCUMENTS

| | | | |
|---|---|---|---|
| 3,857,800 | 12/1974 | Fishbein et al. | 521/176 |
| 4,104,236 | 8/1978 | Pimroth | 260/33.2 R |
| 4,111,865 | 9/1978 | Seefried et al. | 252/182 |
| 4,176,218 | 11/1979 | Demou et al. | 521/129 |

*Primary Examiner*—Maurice J. Welsh
*Attorney, Agent, or Firm*—David L. Hedden; Joseph D. Michaels

[57] ABSTRACT

This invention relates to a process for preparing cellular polymers having urethane groups, isocyanurate groups, or both. The cellular polymers are prepared by reacting an organic polyisocyanate with certain polymer dispersions in the presence of a blowing agent.

The polymer dispersions comprise
 (a) as a continuous phase, a polyol having a functionality of 2 to 8 and a hydroxyl number of 150 to 700; and
 (b) as a dispersed phase, an organic compound having
  (a) at least one Zerewitinoff active hydrogen atom,
  (b) a melting point of 30° C. to 260° C., and
  (c) a molecular weight of 178 to 100,000.

23 Claims, No Drawings

PROCESS FOR THE PREPARATION OF CELLULAR POLYMERS HAVING URETHANE GROUPS, ISOCYANURATE GROUPS, OR BOTH

BACKGROUND OF THE INVENTION

1. Field of the Invention

The invention relates to a process for the preparation of cellular polymers having urethane groups, isocyanurate groups, or both. The polymers are prepared by reacting organic polyisocyanates with compounds having reactive hydrogen atoms which are used in the form of storage-stable crystalline suspensions.

2. Description of the Prior Art

It is known that polyurethane foams with various physical properties can be prepared by reacting compounds having at least two active hydrogen atoms, particularly polyols, with polyisocyanates. Reinforcing agents, chain extenders, cross-linking agents, blowing agents, activators, emulsifiers and other additives may also be incorporated into the reaction mixture. With suitable selection of the components, flexible as well as rigid foams can be prepared. However, it is known in the art that polyurethane foams are not thermally stable at high temperatures.

It is also known that urethane group-containing polyisocyanurates can be prepared by the reaction of polyisocyanates to form ring structures. The reaction may be carried out in the presence of auxiliaries and catalysts. The resultant isocyanurates are reacted with polyols to prepare rigid foams. It is often advantageous to carry out the polyaddition reaction of polyols contemporaneously with the polyisocyanurate reaction.

Rigid foams having urethane and isocyanurate groups are very useful because of their good thermal stability, as well as their optimum insulating capacity. They are well suited for use as insulating materials for the refrigeration industry, construction industry, and others. This is because isocyanurate bonds are thermally more stable than urethane bonds and result in polymers with increased ignition temperature. However, the problem with using these materials is that the polyisocyanurate rigid foams are more brittle and have a lower abrasion resistance.

Because of the problems associated with polyurethane and polyisocyanurate rigid foams which are known in the art, there is a need to develop rigid foams which have increased heat resistance, are less brittle, and have an improved resistance to abrasion. These requirements must be achieved without sacrificing compression strength in and perpendicular to the foaming direction.

SUMMARY OF THE INVENTION

It has been discovered that cellular polymers having urethane groups, isocyanurate groups, or both can be prepared by reacting an organic polyisocyanate with certain polymer dispersions in the presence of a blowing agent. The reaction may be carried out in the presence of catalysts, auxiliaries and additives.

The polymer dispersions comprise
(a) as a continuous phase, a polyol having a functionality of 2 to 8 and a hydroxyl number of 150 to 700; and
(b) as a dispersed phase, an organic compound having
   (a) at least one Zerewitinoff active hydrogen atom,
   (b) a melting point of 30° C. to 260° C., and
   (c) a molecular weight of 178 to 100,000.

The polymer dispersions are storage stable crystalline suspensions. These dispersions have low viscosity and the dispersed phase consists of fine spherulites which are essentially uniform in size.

The cellular polymers have good thermal stability, are not too brittle, and have improved resistance to abrasion. These properties are obtained without sacrificing other properties of the polymers such as compression strength.

The process according to this invention has the advantage that foams can be custom made by varying the composition of the polymer dispersions, for instance, by changing the continuous phase on the one hand, or the disperse crystalline phase on the other hand. The disperse crystalline phase can be incorporated into the foam structure in a targeted controllable manner, namely, by its melting point and/or the transitions from the disperse into the continuous phase. It is particularly advantageous that the disperse phase is incorporated at a point in time where the foam structure is already partially formed so that a targeted stabilization of the cell membranes can take place. This, among other things, prevents shrinking of the resultant foam. Furthermore, the core temperature can be controlled by using the heat of melting.

DESCRIPTION OF THE PREFERRED EMBODIMENTS

As was previously mentioned, the process of this invention comprises the reaction of an organic polyisocyanate with certain polymer dispersions in the presence of a blowing agent and a catalyst. Additives and auxiliaries may also be incorporated into the reaction mixture.

The organic polyisocyanate which may be used in accordance with this invention include aliphatic, cycloaliphatic, and arylaliphatic polyisocyanates. Preferably used are aromatic multifunctional isocyanates. Represntative examples or organic polyisocyanates include alkylene diisocyanates having 4 to 12 carbon atoms in the alkylene radical such as 1,12-dodecamethylene diisocyanate, tetramethylene diisocyanate-1,4, and preferably hexamethylene diisocyanate-1,6; cycloaliphatic diisocyanates such as cyclohexane-1,3- and -1,4-diisocyanate as well as mixtures of these isomers, 1-isocyanato-3,3,5-trimethyl-5-isocyanatomethyl-cyclohexane (known as isophorone diisocyanate), 2,4- and 2,6-hexahydrotoluene diisocyanate as well as the corresponding isomer mixtures, 4,4'-, 2,2'- and 2,4'-dicyclohexylmethane diisocyanate as well as the corresponding isomer mixtures. Preferably used, however, are aromatic di- and polyisocyanates such as 4,4'-, 2,4'- and 2,2'-diisocyanato-diphenylmethane and the corresponding isomer mixtures, 2,4- and 2,6-diisocyanato-toluene and the corresponding isomer mixtures, 1,5-diisocyanato-naphthalene, polyphenyl polymethylene polyisocyanates, 2,4,6-triisocyanato-toluene, and most preferably mixtures of di- and polyphenyl polymethylene polyisocyanates (crude MDI). The referenced di- and polyisocyanates may be used individually or in the form of mixtures.

The so-called modified multifunctional isocyanates, that is products which are obtained by the chemical reaction of the above di- and polyisocyanates, may also be used as the organic polyisocyanate in accordance with this invention. Representative examples of modified organic di- and polyisocyanates include carbodiimide group-containing polyisocyanates according to German Pat. No. 1,092,007; allophanate group-containing polyisocyanate as they are described, for instance, in British Pat. No. 994,890, Belgian Pat. No. 761,626, and published Dutch Application No. 7,102,524; isocyanurate group-containing polyisocyanates as described, for instance, in German Pat. No. 1,022,789, 1,222,067 and 1,027,394 as well as German Published Application Nos. 1,929,034 and 2,004,048; urethane group-containing polyisocyanates as described in Belgian Pat. No. 752,261 or U.S. Pat. No. 3,394,164; acylated urea group-containing polyisocyanates described in German Pat. No. 1,230,778; biuret group-containing isocyanates as described in German Pat. No. 1,101,934 and British Pat. No. 889,050; polyisocyanates produced by telemerization reactions, for instance, according to Belgian Patent 723,640; and ester group-containing polyisocyanates as referred to, for instance, in British Pat. Nos. 965,474 and 1,072,956, U.S. Pat. No. 3,567,765, and German Pat. No. 1,231,688.

Preferably used, however, as organic polyisocyanates are urethane group-containing modified polyisocyanates prepared by reacting the polyisocyanate with low molecular diols, triols or polypropylene glycols; modified 4,4'-diphenylmethane diisocyanate or toluene diisocyanate; carbodiimide group and/or isocyanate ring-containing polyisocyanates, for instance, based on diphenylmethane diisocyanate and/or toluene diisocyanate; toluene diisocyanates; diphenylmethane diisocyanates; mixtures of diphenylmethane diisocyanates and polyphenyl polymethylene polyisocyanates (crude MDI); and mixtures of toluene diisocyanates and crude MDI.

As was previously mentioned, the organic polyisocyanates are reacted with certain polymer dispersions. The polymer dispersions consist of a continuous phase and a dispersed phase. The continuous phase consists of polyols which are generally used in the preparation of flexible foams. These are polyols having a functionality of 2 to 8 and a hydroxyl number of 150 to 800. These polyols are liquid at commonly used processing temperatures for polyurethanes, for instance, 10° C. to 30° C. and particularly 25° C. Suitable polyols for the continuous phase of the polymer dispersion include polyester polyols, polyether polyols, polyester amides, polyacetals, and mixtures thereof.

Polyester polyols which can be used as the continuous phase of the polymer dispersion have functionalities of 2 to 6, preferably 2 to 4, and hydroxyl numbers of 200 to 700, preferably 280 to 490. These polyols are prepared by reacting dicarboxylic acids with multifunctional alcohols. Dicarboxylic acids which can be used in preparing the polyester polyols are preferably aliphatic dicarboxylic acids, having 2 to 12, preferably 4 to 8 carbon atoms in the alkylene radical. Examples include aliphatic dicarboxylic acids such as succinic acid, glutaric acid, pimelic acid, undecane dioic acid, dodecane dioic acid, and preferably adipic acid. Aromatic dicarboxylic acids such as phthalic acid and terephthalic acid may also be used. Alcohols which can be used in preparing the polyester polyols are multifunctional, particularly bifunctional alcohols. Representative examples include propylene glycol, 1,3-propane glycol, dipropylene glycol, 1,5-pentamethylene glycol, 1,8-octamethylene glycol, 1,10-decamethylene glycol, glycerine, trimethylolpropane, pentaerythritol, as well as sugar alcohols for instance, sorbitol. Preferably used are ethylene glycol, diethylene glycol, 1,4-butane glycol and 1,6-hexamethylene glycol. Alkanolamines, dialkanolamines and trialkanolamines, such as ethanolamine, diethanolamine, triethanolamine, and triisopropanolamine may also be used as multifunctional alcohols. The referenced dicarboxylic acids and multivalent alcohols may also be used in the form of mixtures. The following substances have proven to work particularly well and are therefore used on a preferred basis. Polyester polyols of adipic acid or mixtures of succinic, glutaric and adipic acid, and diethylene glycol and alcohol mixtures of ethylene glycol/1,4-butane glycol, ethylene glycol/diethylene glycol, ethylene glycol/trimethylol propane, diethylene glycol/trimethylol propane, ethylene glycol/pentaerythritol, ethylene glycol/triisopropanol amines and di-ethylene glycol/triisopropanol amine.

The polyester polyols have molecular weights of approximately 220 to 3,000 and preferably of 300 to 800. Instead of the referenced polyester polyols which may be used individually or as mixture, homogeneous mixtures of the above-referenced polyester polyols, which are liquid at 10° C. to 30° C., and soluble, rigid organic components, for instance hydroxyl group-containing polyesters or aromatic dicarboxylic acids and preferably unsubstituted linear diols, may also be used.

Preferably used as the continuous phase of the polymer dispersion are polyether polyols having functionalities of 2 to 8, preferably 2 to 4, and hydroxyl numbers of 150 to 800, preferably 200 to 600. These are prepared by reacting one or more alkylene oxides having 2 to 4 carbon atoms in the alkylene radical and an initiator molecule containing 2 to 8, preferably 2 to 4, active hydrogen atoms. These preferred polyether polyols are produced according to familiar processes, for instance, by anionic polymerization with alkali hydroxides such as sodium or potassium hydroxide, or alkali alcoholates such as sodium or potassium methylate, -ethylate, or potassium isopropylate as catalysts, or by cationic polymerization with Lewis acids such as antimonypentachloride, boronfluoride-etherate and others as catalysts.

Suitable alkylene oxides for the preparation of the polyether polyols include tetrahydrofuran, 1,3-propane oxide, 1,2- or 2,3-butylene oxide, styrene oxide, epichlorohydrin. Preferably used are ethylene oxide and propylene oxide. The alkylene oxides may be used individually, alternatingly in sequence, or as mixtures. Possible initiator molecules include water; organic dicarboxylic acids such as succinic acid, adipic acid, phthalic acid and terephthalic acid; aliphatic and aromatic, N-momo-, N,N- and N,N'-dialkyl-substituted diamines having 1 to 4 carbon atoms in the alkyl radical such as mono- and dialkyl-substituted ethylene diamines, diethylene triamines, triethylene tetramine, 1,3-propane diamine, 1,3- or 1,4-butane diamine, 1,2-, 1,3-, 1,4-, 1,5- and 1,6-hexamethylene diamine, phenylene diamine, 2,4- and 2,6-toluene diamine, and 4,4'-, 2,4- and 2,2'-diaminodiphenylmethane. N,N,N',N'-tetrakis(2-hydroxyethyl)ethylenediamine, N,N,N',N'-tetrakis(2-hydroxypropyl)ethylenediamine, N,N,N',N'',N''-pentakis(2-hydroxypropyl)diethylenetriamine, phenyldiisopropanolamine and higher alkylene oxide adducts of aniline produced from compounds of the referenced group are particularly interesting as polyether polyols.

Other initiator molecules include alkanolamines such as ethanol amines, diethanol amines, N-methyl- and N-ethylethanol amines, N-methyl- and N-ethyldiethanol amines, and triethanolamine, ammonium, hydrazine, and hydrazide. Preferably used are multifunctional, particularly bi- and/or trifunctional alcohols such as ethylene glycol, propylene glycol, trimethylene glycol, diethylene glycol, dipropylene glycol, 1,4-butane glycol, 1,6-hexamethylene glycol, glycerine, trimethylol propane, pentaerythritol, sorbitol and sucrose.

The polyether polyols have molecular weights of 200 to 4,000 and preferably of 500 to 3,000. They may be used individually or in the form of mixtures.

Mixtures of polyester polyols and polyether polyols, as well as hydroxyl group-containing polyester amides and polyacetals and their mixtures, may also be used as the continuous phase of the polymer dispersion if they comply with the above-referenced conditions.

Suitable as disperse phase of the polymer dispersion are crystalline organic compounds containing at least one Zerewitinoff active hydrogen atom. Active hydrogen atoms may be found in compounds having an —OH, —NH$_2$, —NH and/or —COOH group in bonded form. The compounds have melting points of 30° C. to 260° C., preferably 40° C. to 170° C. and molecular weights of 178 to 100,000 and larger, preferably of 178 to 15,000 and particularly 320 to 4,000.

The organic compounds are completely or substantially crystallized. However, organic compounds containing amorphous components may also be used if the amount of amorphous components is less than 60 percent by weight, preferably less than 40 percent by weight, and particularly less than 15 percent by weight, relative to the total weight. Such compounds are referred to as partially crystalline. Examples of organic compounds which can be used as the disperse phase of the polymer dispersion include the following:

1. Rigid crystalline mono- to tetrafunctional, preferably difunctional, polyester polyols may be used. Such polyols have hydroxyl numbers from 10 to 500, preferably of 40 to 240; and melting points according to Kraemer-Sarnow-Nagel (KSN) of 30° C. to 240° C., preferably 50° C. to 170° C. and particularly 70° C. to 140° C.; and are prepared from aromatic and/or aliphatic dicarboxylic acid and primarily symmetrical diols.

The polyester polyols are prepared by reacting dicarboxylic acids and their derivatives with a multifunctional alcohol. Examples of dicarboxylic acids and derivatives which may be used to prepare the polyester polyols include aromatic dicarboxylic acids, their anhydrides and diesters prepared with mono- and bifunctional alcohols having 1 to 4 carbon atoms. Examples include isophthalic acid, terephthalic acid, and orthophthalic acid, unsubstituted and halogen-substituted phthalic anhydrides, for instance, phthalic anhydride, tetrachloro- and tetrabromophthalic anhydride, dimethylethyl ester of phthalic, dimethylester of terephthalic acid, bis-2-hydroxyethyl terephthalate, and dibutylester of phthalic acid; aliphatic dicarboxylic acids, their anhydrides and diesters, which can possibly also contain copolymerizable double bonds such as succinic acid, succinic acid anhydride, glutaric acid, adipic acid; aliphatic dicarboxylic acid mixtures of succinic, glutaric and adipic acid, as well as maleic acid, maleic anhydride, fumeric acid, dimethylester of fumaric acid, endomethylene tetrahydrophthalic acid, hexachloroendomethylene tetrahydrophthalic acid, hexahydrophthalic acid, tetrahydrophthalic acid, hexahydrophthalic acid anhydride, and tetrahydrophthalic acid anhydride. The polyester polyols are prepared by reacting the dicarboxylic acids or derivatives with bifunctional symmetric alcohols such as ethylene glycol, tripropylene glycol, 1,4-butane glycol, 1,6-hexamethylene glycol, 1,8-octamethylene glycol, 1,10-decamethylene glycol, and neopentyl glycol, neopentyl glycol ester of phthalic acid, dibromoneopentyl glycol, 4,4'-dihydroxy-dicyclohexylmethane, 4,4'-dihydroxydicyclohexylpropane-2,2, diethylene glycol, triethylene glycol, 1,4-dihydroxymethylcyclohexane, 1,4-butanediol, bis-ethoxylated bisphenol A, and its completely hydrogenated derivative.

Additional mono- and polyfunctional carboxylic acids, monoalcohols, unsymmetrically structured diols, and multifunctional alcohols may be used in subordinate quantities for the manufacture of the crystalline polyester polyols. Examples include monocarboxylic acids such as benzoic acid, and 2-ethylhexanoic acid, and polycarboxylic acids such as trimetillitic acid which may be used in quantities of up to 10 mole percent relative to the used aromatic and/or aliphatic carboxylic acids. In quantities up to 15 mole percent, relative to the symmetrical bifunctional alcohols, unsymmetrically structured diols such as propylene glycol, dipropylene glycol, and multifunctional alcohols such as glycerine and trimethylolpropane may be used whereas monoalcohols such as benzyl alcohol, hexanol and 2-ethylhexanol may be added in quantities up to 20 mole percent relative to symmetrical bifunctional alcohols.

The crystallizable rigid polyester polyols, which may, for instance, be produced by melting condensation, are frequently incurred in amorphous form. Depending upon the structure of the product, they quickly crystallize or they do not crystallize at all. However, they always crystallize when heated in a solvent such as ethanol or in the polyester and/or polyether polyols which may be used as the continuous phase. As already illustrated, the raw materials must be selected in such a manner that the melting range is located between 30° C. and 240° C. Suitable polyester polyols normally have molecular weights of 220 to approximately 10,000.

2. Oligoamides having molecular weights of 142 to 5,000, preferably of 500 to 3,000 may also be used as the dispersed phase. These are prepared by polycondensation of aliphatic or aromatic dicarboxylic acids with aliphatic primary and/or secondary diamines in mole ratios of 1:1.05 to 1:2, preferably 1:1.2 to 1:1.6. Representative of dicarboxylic acids which can be used to prepare the oligoamides include aliphatic dicarboxylic acids such as succinic, glutaric and adipic acid and their mixtures, aromatic dicarboxylic acids such as phthalic acid and terephthalic acid, and the corresponding esters of dicarboxylic acid such as dimethylester of adipic, glutaric, succinic, phthalic and terephthalic acid. Representative examples of amines which can be used to prepare the oligamides include aliphatic primary and secondary diamines as well as alkanolamines such as ethylene diamine, hexamethylene diamine, ethanolamine and diethanolamine, and preferably piperazine. Oligoamide produced from a mixture of succinic, glutaric and adipic acid and piperazine having a molecular weight of approximately 1,500 and of phthalic acid and piperazine having a molecular weight of approximately 400, are used in particular.

3. Crystalline oligo- or polyester amines having molecular weights of 400 to 5,000, preferably of 550 to 3,000, may also be used as the dispersed phase. These are prepared by polycondensation of aliphatic, cycloaliphatic and/or aromatic diols and aromatic aminocarboxylic acids or -esters. Part of the aminocarboxylic acids may be replaced by aromatic dicarboxylic acids or their dialkylesters prepared with monofunctional $C_1$ to $C_4$ alcohols. Partial replacement of the aromatic by aliphatic dicarboxylic acids is also possible. The oligo or polyester amines generally contain 20 to 80 mole percent of aromatic aminocarboxylic acids relative to the total amount of carboxylic acids and are condensed in such molar quantities that the ratio of carboxyl or ester groups of the carboxylic acids to hydroxyl groups of the diols is 1:0.5 to 1:1.9, preferably 1:0.8 to 1:1.5, and particularly approximately 1:1. Representative examples of alcohols which can be used to prepare the oligo- or polyester amines include diols such as ethylene glycol, 1,4-butanediol, 1,6-hexanediol, 1,8-octanediol, 1,10-decanediol, neopentyl glycol, dibromoneopentyl glycol, 4,4'-dihydroxydicyclohexylmethane, 4,4'-dihydroxydicyclohexylpropane-2,2,1,4-dihydroxymethylcyclohexane, bis-ethoxylated bisphenol A and its completely hydrogenated derivate. The alcohols are reacted with aromatic amino carboxylic acids and their esters such as p-aminobenzoic acid, methylester and ethylester of p-aminobenzoic acid, aromatic dicarboxylic acids and -diesters such as isophthalic acid, terephthalic acid, and orthophthalic acid and the corresponding dimethyl esters and aliphatic dicarboxylic acids such as succinic and adipic acids.

Another method for the manufacture of oligo or polyester amines incorporates the use of $\beta$-hydroxyalkylarylamines such as $\beta$-hydroxyethyl aniline which may be condensed with the above-referenced diols and dicarboxylic acids or their esters.

The oligo or polyester amines are produced as amorphous or crystalline products with melting points up to approximately 190° C. (according to KSN) upon cooling of the molten product. The reactants for the polycondensation must be selected in such a manner that the oligo and/or polyester amines have a melting range between 30° C. and 190° C. after crystallization in a solvent such as ethanol or in a polyether or polyester polyol.

4. Crystalline oligo or polyurethanes having molecular weights of 280 to 5,000, preferably of 400 to 3,000 may also be used as the dispersed phase. These are prepared by polyaddition from organic diisocyanates such as 4,4'-diisocyanatodiphenylmethane and hexamethylene diisocyanate and aliphatic diols such as 1,4-butanediol, 1,6-hexanediol, ethylene glycol, diethylene glycol, and triethylene glycol in mole ratios of 1:1.05 to 1:2, preferably 1:1.3 to 1:2. Oligourethanes of 4,4'-diisocyanatodiphenylmethane and 1,6-hexanediol having a molecular weight of approximately 500 have proven to work particularly well.

5. Crystalline and/or partially crystalline hydroxyl group-containing polyesters having molecular weights of 600 to 20,000, preferably of 800 to 10,000, and melting points of 30° C. to 180° C. may also be used as the dispersed phase. These may be prepared for instance by polymerization of alkylene oxides such as ethylene oxide, cyclohexene oxide, styrene oxide, and tetrahydrofuran according to familiar processes.

6. Polyacetals and polyacetal copolymers having molecular weights of 600 to 100,000, preferably of 1,000 to 18,000 and melting points of 40° C. to 180° C. may also be used as the dispersed phase. Examples include polyoxymethylene and butanediol formals.

The organic compounds are dispersed in the continuous phase of the polymer dispersion in quantities of 0.5 to 50 percent by weight, preferably 1 to 30 percent by weight. They may be used individually as well as in the form of mixtures. Preferably used are rigid polyester polyols, polyester amines, and polyacetals. In order to prepare the polymer dispersions, the polyols which form the continuous phase and the organic compounds which form the dispersed phase are mixed at room temperature and are dissolved while being stirred at increased temperatures, for instance, at temperatures of 70° C. to 300° C., preferably 100° C. to 180° C. This may be done in the presence of the emulsifiers such as polyalkylene ether mixed polymerizates, as they are described in German Published Application No. 2,657,808. The resultant homogeneous solution is allowed to cool while being stirred during which process the organic compound crystallizes, for instance, in the form of fine platelets or spherolites. The spherolites, in the continuous phase, have an average particle diameter of 1 micron to 100 microns, preferably 5 microns to 60 microns.

Prior to processing, the storage-stable polymer dispersions may be diluted with the above-referenced polyester and/or polyether polyols, that is, they may be adjusted to the optimum content of organic compound as the dispersed phase.

The blowing agents, which may be used in the process of this invention for the manufacture of foams, include water which reacts with isocyanate groups by forming carbon dioxide. The water quantities which are advantageously used are 0.1 to 3 percent relative to the weight of the polyisocyanate, or 0.1 to 2 percent relative to the total weight of polyisocyanate and crystalline suspension. Larger water quantities may also be used under certain circumstances.

Other blowing agents which may be used are low-boiling liquids which evaporate under the influence of the exothermal polymerization and/or polyaddition reaction. Suitable compounds are liquids which are inert with respect to the organic polyisocyanate and which have boiling points below 100° C. Representative examples of such compounds are halogenated hydrocarbons such as methylene chloride, trichlorofluoromethane, dichlorodifluoromethane, dichloromonofluoromethane, dichlorotetrafluoroethane, and 1,1,2-trichloro-1,2,2-trifluoroethane. Mixtures of these low-boiling liquids and/or mixtures with other substituted or unsubstituted hydrocarbons may also be used.

The most appropriate amount of these compounds used is a function of the foam density which is to be achieved as well as the amount of water used. Generally, quantities of 5 to 40 percent by weight, relative to 100 parts by weight of organic polyisocyanate, or 2 to 30 percent, relative to the total weight of polyisocyanate and polymer dispersion will provide satisfactory results.

Suitable catalysts for accelerating the polyurethane formation between the polymer dispersion and the polyisocyanates include tertiary amines such as dimethylbenzylamine, N,N,N',N'-tetramethyldiaminoethylether, bis(diphenylaminopropyl)urea, N-methyl- or N-ethylmorpholine, dimethylpiperazine, 1,2-dimethylimidazole, 1-aza-bicyclo(3,3,0)octane and preferably triethylenediamine; metal salts such as tin dioctoate, lead octoate, tin diethylhexoate, and preferably tin-(II)-salts and dibutyltin dilaurate; as well as particularly mixtures of tertiary amines and organic tin salts. Preferably used are 0.1 to 5.0 percent by weight of tertiary amines and/or 0.01 to 1.0 percent by weight of metal salts relative to the weight of the crystallite suspension.

In order to promote isocyanurate group formation, catalysts which promote the reaction of polyisocyanates have proven to work well. Representative examples include strong bases such as quaternary ammonium hydroxides, for instance, benzyltrimethylammonium hydroxide; alkali metal hydroxides such as sodium or potassium hydroxide; alkali metal alkoxides, for instance, sodium methylate and potassium isopropylate; trialkylphosphines, for instance, triethylphosphines; alkylaminoalkylphenols, for instance, 2,4,6-tris(dimethylaminomethyl)phenol; 3-and/or 4-substituted pyridines, for instance, 3- or 4-methylpyridine; organic metal salts, for instance, tetrakis(hydroxyethyl)sodium borate; Friedel-Crafts catalysts, for instance, aluminum chloride, iron-(III)-chloride, boronfluoride and zinc chloride and alkali metal salts of weak organic acids and nitrophenolates, for instance, potassium octoate, potassium-2-ethylhexoate, potassium benzoate, sodium picrate and phthalimide-potassium. Preferably used are the strong basic N,N',N"-tris(dialkylaminoalkyl)-s-hexahydrotriazines, for instance, N,N',N"-tris(dimethylaminopropyl)-s-hexahydrotriazine, possibly combined with aliphatic low molecular mono- and/or dicarboxylic acids, for instance, acidic acid and/or adipic acid or aromatic dicarboxylic acids such as benzoic acid.

The suitable quantity of catalysts for forming isocyanurate groups is a function of the effectiveness of the catalyst in question. Generally, it has proven to be advantageous to use 1 to 15 parts by weight, preferably 3.5 to 10 parts by weight of catalyst for 100 parts by weight of organic polyisocyanate.

For the manufacture of isocyanurate group-containing polyurethane foams, the catalysts promoting the urethane and isocyanurate group formation may also be mixed.

As already indicated, auxiliaries and additives may be incorporated in the foamable reaction mixture of polyisocyanates, polymer dispersions, blowing agents and catalysts. These include, for instance, chain extenders, organic and inorganic fillers, surface-active foam stabilizers, hydrolysis protection agents, pore regulators, fungistats and bacteriostats, colors, pigments and flame retardants.

In accordance with the process of this invention, the rigid foams are preferably produced without adding commonly-used chain extenders or cross-linking agents. However, in some cases, for instance, for reasons of process technology, it has proven to be advantageous to use chain extenders or cross-linking agents. Suitable chain extenders or cross-linking agents have molecular weights of 30 to 600, preferably 60 to 300, and preferably have 2 active hydrogen atoms. Representative examples include aliphatic and/or aromatic diols having 2 to 14, preferably 2 to 6, carbon atoms such as propanediol, pentanediol, 1,6-hexanediol, and preferably ethanediol, 1,4-butanediol, and bis(2-hydroxyethyl)hydroquinone; diamines such as ethylene diamines and possibly 3,3'- or 3,3',5,5'-di- or tetra-substituted 4,4'-diaminodiphenylmethanes; ethanolamines such as triethanolamine; and polyhdyroxyl compounds such as glycerine, trimethylolpropane, and low molecular hydroxyl group-containing polyalkylene oxide of the above-referenced raw materials.

Fillers, for instance organic and inorganic fillers, having particle sizes of less than 10 microns, preferably of 0.1 to 5 microns, may be added to the polymer dispersion in quantities of 5 to 30 percent by weight, preferably 10 to 20 percent by weight, relative to the total weight of the crystallite suspension.

Examples of organic fillers include the following: brittle resins which are used as binders for the printing industry, for instance those based on phenol, colophonium, or melamine and formaldehyde; polyesters having melting points above 190° C., preferably cross-linked polyesters based on di- or higher functional carboxylic acids with di- or with monomers such as (meth)-acrylic acid derivates; homo- and copolymerizates of cyclopentadiene; ketone resins, for instance those based on cyclohexanone; and brittle polyurethane materials having melting points higher than 190° C., for instance cross-linked polyurethanes and isocyanurate group-containing polyurethanes, polyvinyl chloride, polyamide-6 and -6,6, acrylate graft rubbers, butadiene graft rubbers, and polyvinyl acetate.

Proven to have worked particularly well and therefore preferably used, however, are inorganic fillers such as commonly used fillers, reinforcing agents, weighting agents, agents for improving the abrasion behavior in paints, coating agents and so forth. Inorganic pigments, however, may also be used. Representative examples include silicate minerals, for instance stratified silicates such as antigorite, serpentine, hornblendes, amphibolites, crisotile, talcum; metal oxides such as kaolin, aluminum oxide hydrate, titanium oxides, iron oxides; metal salts such as chalk, heavy spar, barium sulfate; and inorganic pigments such as cadmium sulfide, zinc sulfide, as well as glass.

Examples of additional auxiliaries include surface-active substances which support the homogenization of the raw materials and which may also be suited for regulating the cell structure of the foams. Representative examples include siloxane-oxyalkylene mixed polymerizates and other organopolysiloxanes; ethoxylated alkyl phenols; ethoxylated fatty alcohols; paraffin oils; esters of castor oil or resinoleic acid and Turkish red oil. These auxiliaries are used in quantities of 0.1 to 5 parts by weight per 100 parts by weight of the mixture of polyisocyanate and polymer dispersion.

Suitable flame retardants include tricresyl phosphate, tris-2-chloroethylphosphate, tris-chloropropylphosphate, and tris-2,3-dibromopropylphosphate.

In addition to the already mentioned halogen-substituted phosphates, inorganic flame retardants may also be used to render the foams flame resistant. These include antimony trioxide, arsenic oxide, ammonium phosphate, ammonium sulfate, aluminum oxide hydrate, and elementary phosphorus as well as isocyanuric acid derivatives such as melamine, dicyandiamide, and guanidine salts such as guanidine carbonate. Generally, it has proven to be advantageous to use 5 to 50 parts by weight, preferably 5 to 25 parts by weight of the referenced flame retardants per 100 parts by weight of the mixture of organic polyisocyanate and crystalline suspension.

More detailed information concerning the above referenced auxiliaries and additives are contained in references such as the monograph by J. H. Saunders and K. C. Frisch entitled *High Polymers*, "Polyurethanes", Vol. XIV, Parts 1 and 2, (Interscience Publishers, 1962 or 1964).

In order to prepare cellular polymers having urethane groups, the organic polyisocyanate and the polymer dispersion are reacted in such quantities that the ratio of reactive hydrogen atoms to isocyanate groups is 1:0.8 to 1.0:2.5, preferably 1:0.9 to 1.0:1.2, and particularly 1:1. The amount of the disperse phase in the reaction mixture amounts to 0.5 to 50 percent by weight, preferably 1 to 30 percent by weight relative to the weight of the continuous phase.

In order to prepare cellular polymers having urethane and isocyanurate groups, the organic polyisocyanates and the polymer dispersion are reacted in such quantities that the ratio of isocyanate groups of the organic polyisocyanate to reactive hydrogen atoms of the polymer dispersion is 1:1 to 60:1, preferably of 2:1 to 10:1. In this case also, the amount of the disperse phase in the reaction mixture amounts to 0.5 to 50 percent by weight, preferably 1 to 30 percent by weight, relative to the weight of the continuous phase.

The urethane and/or isocyanurate group-containing foams are preferably produced according to the one-shot process. For this process, the polyisocyanates are intensively mixed with the polymer dispersion, the catalysts, the blowing agent and possibly the auxiliaries and additives in the referenced quantity ratios at temperatures of 0° C. to 50° C., preferably 15° C. to 40° C. and the reaction mixture is then allowed to foam in open or closed molds.

The polyurethane foams produced in accordance with this invention have densities of 10 grams to 300 grams per liter, preferably 60 grams to 130 grams per liter, if allowed to foam freely. The urethane group-containing polyisocyanurate foams have densities of 5 grams to 100 grams per liter, preferably of 10 to 50 grams per liter.

The foams are used as insulating materials in refrigeration equipment for insulating pipes and in the construction industry.

The examples which follow are supplied to illustrate the various aspects of this invention, but are in no way intended to limit its application. The parts referred to in the examples are by weight unless otherwise designated and the temperatures are in degrees Centigrade unless otherwise specified.

EXAMPLES 1–32

These examples illustrate the method of preparing the polymer dispersions which are used to prepare cellular polymers containing urethane groups, isocyanurate groups, or both.

Polyols I to X, compiled in Table 1, were used as the continuous phase of the polymer dispersion.

The organic compounds A to Z, compiled in Table 2, were used as the disperse phase.

The organic compound used as the disperse phase and the polyol used as the continuous phase are heated in quantities referred to in Table 3 until a homogeneous solution, which may be slightly clouded, has been formed. Subsequently, the solution is allowed to cool, possibly in the presence of an emulsifier, while being stirred. During this process, the organic compound separates as a fine particle disperse phase. All of the polymer dispersions so prepared were storage stable.

TABLE 1

| Abbreviation | Description of the Polyols (continuous phase) Composition | OH-Number |
|---|---|---|
| I | Diethylene glycol adipate | 345 |
| II | Diethylene glycol adipate | 341.6 |
| III | Diethylene glycol adipate | 344 |
| IV | Polyester polyol of a mixture of succinic (30%), glutaric (40%), adipic acid (39%), and a mixture of ethylene glycol and pentaerythritol | 330 |
| V | Mixture of: 30 parts by weight of a polyester polyol of 1 mole of phthalic acid and 1.35 moles of ethylene glycol (OH number 131) and 70 parts by weight of II | 248 |
| VI | Mixture of: 30 parts by weight of a polyester polyol of 1 mole of phthalic acid and 2 moles of diethylene glycol (OH number 362) and 70 parts by weight of IV | 344 |
| VII | Mixture of: 30 parts by weight of a polyester polyol of 1 mole of phthalic acid and 2 moles of dipropylene glycol (OH number 271) and 70 parts by weight of I | 323 |
| VIII | Mixture of: 30 parts by weight of a polyester amide of 2 moles of para-aminobenzoic acid and 1 mole of neopentylglycol (amine number 241) and 70 parts by weight of III | 241 (Amine Number: 72) |
| IX | Polyether-polyol mixture based on 66 parts by weight of sucrose/propylene oxide 20 parts by weight of glycerine/propylene oxide 13.6 parts by weight of water/propylene oxide | 400 |
| X | Polyether polyol mixture based on 83 parts by weight of a sorbitol/water/propylene oxide 17 parts by weight of a glycerine/propylene oxide | 460 |

TABLE 2

| Abbreviation | Description of the Organic Compound (disperse phase) Composition | OH-Number | Melting Point+ °C. |
|---|---|---|---|
| A | Polyester polyol of 1 mole of isophthalic acid, 2 moles | 314 | 85 |

TABLE 2-continued

Description of the Organic Compound (disperse phase)

| Abbreviation | Composition | OH-Number | Melting Point+ °C. |
|---|---|---|---|
| | neopentyl glycol and 0.06 moles ethylene glycol | | |
| B | Polyester polyol of 1 mole isophthalic acid, 1.38 moles neopentyl glycol and 0.06 mole ethylene glycol | 99 | 115 |
| C | Polyester polyol of 0.5 mole terephthalic acid, 0.5 mole phthalic acid and 1.36 moles ethylene glycol | 149 | 55 |
| D | Polyester polyol produced by esterification and/or transesterification of 1 mole of terephthalic acid, 1 mole of a dimethyl ester mixture of succinic, glutaric and adipic acids and 2.35 moles of ethylene glycol | 64 | not determined |
| E | Polyester polyol of 1 mole of terephthalic acid, 0.5 mole succinic acid and 1.85 moles ethylene glycol | 129 | 171 |
| F | Polyester polyol of 1 mole of terephthalic acid, 0.5 mole adipic acid and 1.85 moles ethylene glycol | 310 | 170 |
| G | Polyester polyol of 1 mole of terephthalic acid, 1.3 moles neoopentyl glycol and 0.06 mole ethylene glycol | 129 | 121.5 |
| H | Oligoamide of 1 mole of a dimethylester mixture of succinic, glutaric and adipic acid and 1.3 mole of piperazine, 3.5% NH2 groups | Amine Number 125 | 175 amorphous 200 crystalline in ethanol |
| I | ⟨❍⟩—NH—CH$_2$—CH$_2$O—CO—⟨❍⟩—CO—OCH$_2$—CH$_2$—NH—⟨❍⟩ | 127 | 167.5 |
| J | HO—(CH$_2$)—O—CO—NH—⟨❍⟩—CH$_2$—⟨❍⟩—NH—CO—O—(CH$_2$)$_6$—OH | 230 | 150 |
| K | Oligourethane of 1 mole hexamethylene diisocyanate and 2 moles 1,6-hexanediol | 277 | 123 |
| L | Oligourethane of 1 mole hexamethylene diisocyanate and 2 moles 1,4-butanediol | 322 | 158 |
| M | Oligourethane of 1 mole 4,4'-diphenylmethane diisocyanate and 2 moles 1,4-butanediol | 260 | 224 |
| N | Oligourethane of 1 mole 4,4'-diphenylmethane diisocyanate and 2 moles ethylene glycol | 299 | 255 |
| O | Oligoester amine of 1 mole dimethylterephthalate, 2 moles 1,6-hexanediol and 2 moles of ethyl ester of para-aminobenzoic acid | 88.6 | 92.7 |
| P | Oligoester amine of 1 mole dimethylterephthalate, 2 moles 1,4-butanediol and 2 moles of ethyl ester of para-aminobenzoic acid | 127 | 167.5 |
| Q | Oligoamide of 1 mole of dimethyl ester of phthalic acid and 1.3 moles pipazine | 8 weight % N | 97.5 |
| R | Polyethylene glycol | 74.8 | 45 |
| S | Polyethylene glycol | 18.7 | 60 |
| T | Polytetrahydrofuran | 112.2 | 50–70 |
| U | Polyethylene-polypropylene glycol | 16.5 | 45 |
| V | Polytetrahydrofuran with NH$_2$ end groups (produced by the addition of acrylonitrile to the OH group of polytetrahydrofuran and hydrogenation of the nitrole group) | Amine Number 16.5 | 50–70 |
| W | Polytetrahydrofuran | 56.1 | 50–70 |
| X | Polyacetal having the formula —((CH$_2$)$_4$—OCH$_2$—O—)$_x$ | 7.5 | 45–60 |
| Y | Polyacetal having the formula —((CH$_2$)$_4$—OCH$_2$—O—)$_x$ | 11.2 | 45–60 |
| Z | Polyacetal having the formula —((CH$_2$)$_4$—OCH$_2$—O—)$_x$ | 14 | 45–60 |

+determined according to KSN

TABLE 3

Description of Polymer Dispersion

| Example | Disperse Phase Type | Disperse Phase Quantity [parts by weight] | Continuous Phase Type | Continuous Phase Quantity [parts by weight] | Viscosity [mPas 23° C.] |
|---|---|---|---|---|---|
| 1 | B | 30 | I | 70 | 2 360 |
| 2 | D | 30 | III | 70 | 1 880 |
| 3 | E | 30 | II | 70 | 2 635 |
| 4 | A | 30 | IV | 70 | 17 050 |
| 5 | H | 30 | I | 70 | 14 540 |
| 6 | C | 30 | I | 70 | 3 145 |
| 7 | G | 30 | I | 70 | Thixotropic |
| 8 | H | 10 | IX | 90 | 11 380 |
| 9 | I | 10 | X | 90 | 16 925 |
| 10 | J | 20 | I | 80 | Not Measured |
| 11 | according to example 1 | 15 | V | 50 | " |
| 12 | according to example 1 | 15 | VI | 50 | " |
| 13 | according to example 1 | 15 | VIII | 50 | " |

TABLE 3-continued

| Example | Description of Polymer Dispersion | | | | Viscosity [mPas 23° C.] |
|---|---|---|---|---|---|
| | Disperse Phase | | Continuous Phase | | |
| | Type | Quantity [parts by weight] | Type | Quantity [parts by weight] | |
| 14 | according to example | 1 | 15 | IX | 50 | " |
| 15 | according to example | 1 | 15 | VII | 50 | " |
| 16 | B | 10 | IX | 90+ | " |
| 17 | K | 10 | IX | 90 | " |
| 18 | L | 10 | IX | 90 | " |
| 19 | M | 10 | IX | 90 | " |
| 20 | N | 10 | IX | 90 | " |
| 21 | O | 10 | I | 90 | " |
| 22 | P | 10 | I | 90 | " |
| 23 | Q | 10 | I | 90 | " |
| 24 | R | 10 | IX | 90 | " |
| 25 | S | 10 | IX | 90 | " |
| 26 | T | 10 | IX | 90 | " |
| 27 | U | 10 | IX | 90 | " |
| 28 | V | 10 | IX | 90 | " |
| 29 | W | 10 | IX | 90 | " |
| 30 | X | 10 | IX | 90 | " |
| 31 | Y | 10 | IX | 90 | " |
| 32 | Z | 10 | IX | 90 | " |

+plus 0.11 parts by weight of an emulsifier produced by copolymerization of styrene (33.3 percent by weight) and a polyether adduct (66.6 percent by weight) of maleic anhydride (1 percent by weight) and succinic anhydride (1 percent by weight) to polyethylene glycol (mole weight 9000)

EXAMPLES 33 TO 74

The following examples illustrate the preparation of cellular polymers by using the polymer dispersions of Examples 1–33. In these examples, an A-component and B-component reaction mixture are prepared. The A-component is a mixture of a polymer dispersion, cross-linking agent, trichlorofluoromethane, foam stabilizer, and catalyst.

The B-component is a mixture of diphenylmethane diisocyanates and polyphenyl polymethylene polisocyanates (crude MDI; NCO-content: 31 percent by weight).

Components A and B are mixed intensively at 23° C. and are allowed to foam in a carton (dimensions 22×22×20 centimeters). The type and quantities of the reactants used, as well as the properties of the resultant foams, are summarized in Table 4.

In Table 4 the symbols stand for the following:
Catalysts:
DMEA: Dimethylethanolamine
TREDA: Triethylene diamine
HHT: Tris-(N,N-dimethylaminopropyl)-s-hexahydrotraizine Foam Stabilizers:
OS 710: Foam stabilizer based on silicone OS 710 by Bayer AG, Leverkusen
DC 190: Foam stabilizers based on silicone; DC 190 or DC 193: DC 193 by Dow Corning Corporation, Midland, Mich.

$$KZ: \text{Characteristic} = \frac{\text{Isocyanate quantity (actual)} \times 100}{\text{Isocyanate quantity (theoretical)}}$$

TABLE 4

| Example | Polymer Dispersion | | Crude MDI | | Manufacture of Foams | | Catalyst | | Cross-Linking Agent | | $CCl_3F$ [g] |
|---|---|---|---|---|---|---|---|---|---|---|---|
| | | | | | Foam Stabilizer | | | | | | |
| | Type According To Example | Quantity [g] | Quantity [g] | KZ | Type | Quantity [g] | Type | Quantity [g] | Type | Quantity [g] | |
| 33 | 1 | 300 | 216.1 | 110 | OS 710 | 4 | H$_2$O | 3 | — | — | 40.0 |
| | | | | | | | DMEA | 3 | | | |
| | | | | | | | TREDA | 4.1 | | | |
| 34 | 1 | 150 | 196.5 | 200 | DC 193 | 1 | HHT | 3 | — | — | 46.9 |
| 35 | 1 | 150 | 210 | 200 | DC 193 | 1 | HHT | 3 | Glycerine | 5 | 49.4 |
| 36 | 1 | 150 | 315.0 | 300 | DC 193 | 1 | HHT | 3 | Glycerine | 5 | 63.4 |
| 37 | 1 | 150 | 294.7 | 300 | DC 193 | 1 | HHT | 3 | — | — | 60.0 |
| 38 | 2 | 150 | 196.34 | 200 | DC 193 | 1 | HHT | 3 | — | — | 46.9 |
| 39 | 3 | 150 | 215.9 | 200 | DC 193 | 1 | HHT | 3 | — | — | 49.6 |
| 40 | 4 | 150 | 242.71 | 200 | DC 193 | 1 | HHT | 3 | — | — | 53.1 |
| 41 | 1 | 100 | 218.06 | 200 | DC 193 | 1 | HHT | 2 | — | — | 49.8 |
| | I | 50 | | | | | | | | | |
| 42 | 6 | 150 | 207.35 | 200 | DC 193 | 1 | HHT | 3 | — | — | 48.4 |
| 43 | 7 | 150 | 203 | 200 | DC 193 | 1 | HHT | 3 | — | — | 56.5 |
| 44 | 8 | 150 | 268 | 200 | DC 193 | 1 | HHT | 5 | — | — | 56.5 |
| 45 | 8 | 150 | 402 | 300 | DC 193 | 1 | HHT | 5 | — | — | 47 |
| 46 | 9 | 150 | 316.9 | 200 | DC 193 | 1 | HHT | 5 | — | — | 63 |
| 47 | 10 | 75 | 242.35 | 200 | DC 193 | 1 | HHT | 3 | — | — | 53.1 |
| | I | 75 | | | | | | | | | |
| 48 | 10 | 75 | 363.52 | 300 | DC 193 | 1 | HHT | 3 | — | — | 69.3 |
| | I | 75 | | | | | | | | | |
| 49 | 11 | 150 | 201.13 | 200 | DC 193 | 1 | HHT | 3 | — | — | 47.6 |

TABLE 4-continued

| | | | | | | | | | | | |
|---|---|---|---|---|---|---|---|---|---|---|---|
| 50 | 11 | 150 | 301.69 | 300 | DC 193 | 1 | HHT | 3 | — | — | 61 |
| 51 | 12 | 150 | 222.86 | 200 | DC 193 | 1 | HHT | 3 | — | — | 50.5 |
| 52 | 12 | 150 | 334.29 | 300 | DC 193 | 1 | HHT | 3 | — | — | 65.4 |
| 53 | 13 | 150 | 211.92 | 200 | DC 193 | 1 | HHT | 3 | — | — | 49.0 |
| 54 | 13 | 150 | 317.88 | 300 | DC 193 | 1 | HHT | 3 | — | — | 49.0 |
| 55 | 14 | 150 | 364.7 | 300 | DC 193 | 1 | HHT | 3 | — | — | 69.5 |
| 56 | 15 | 150 | 215.18 | 200 | DC 193 | 1 | HHT | 3 | — | — | 49.5 |
| 57 | 15 | 150 | 322.77 | 300 | DC 193 | 1 | HHT | 3 | — | — | 63.9 |
| 58 | 16 | 18,600 | 17,512 | 110 | DC 190 | 186 | DMEA/TREDA (4:1) | 186 | — | — | 2,790 |
| 59 | 17 | 100 | 103.0 | 110 | DC 190 | 1 | DMEA/TREDA (4:1) | 1 | — | — | 27.44 |
| 60 | 18 | 100 | 104.19 | 110 | DC 119 | 1 | DMEA/TREDA (4:1) | 1 | — | — | 27.6 |
| 61 | 19 | 100 | 102.54 | 110 | DC 190 | 1 | DMEA/TREDA (4:1) | 1 | — | — | 27.4 |
| 62 | 20 | 100 | 103.58 | 110 | DC 190 | 1 | DMEA/TREDA (4:1) | 1 | — | — | 27.5 |
| 63 | 21 | 100 | 84.74 | 110 | DC 190 | 1 | DMEA/TREDA (4:1) | 1 | — | — | 25.0 |
| 64 | 22 | 100 | 85.86 | 110 | DC 190 | 1 | DMEA/TREDA (4:1) | 1 | — | — | 25.15 |
| 65 | 23 | 150 | 236.25 | 200 | DC 193 | 1 | HHT | 3 | — | — | 52.2 |
| 66 | 24 | 100 | 97.62 | 110 | DC 190 | 1 | DMEA/TREDA (4:1) | 1 | — | — | 26.5 |
| 67 | 25 | 100 | 96.13 | 110 | DC 190 | 1 | DMEA/TREDA (4:1) | 1 | — | — | 26.5 |
| 68 | 26 | 100 | 98.62 | 110 | DC 190 | 1 | DMEA/TREDA (4:1) | 1 | — | — | 26.9 |
| 69 | 27 | 100 | 96.07 | 110 | DC 190 | 1 | DMEA/TREDA (4:1) | 1 | — | — | 26.5 |
| 70 | 28 | 100 | 98.34 | 110 | DC 190 | 1 | DMEA/TREDA (4:1) | 1 | — | — | 26.8 |
| 71 | 29 | 100 | 97.13 | 110 | DC 190 | 1 | DMEA/TREDA (4:1) | 1 | — | — | 26.7 |
| 72 | 30 | 100 | 95.83 | 110 | DC 190 | 1 | DMEA/TREDA (4:1) | 1 | — | — | 26.5 |
| 73 | 31 | 100 | 95.93 | 110 | DC 190 | 1 | DMEA/TREDA (4:1) | 1 | — | — | 26.5 |
| 74 | 32 | 100 | 96.0 | 110 | DC 190 | 1 | DMEA/TREDA (4:1) | 1 | — | — | 26.5 |

| | Mechanical Properties | | | | | | | | |
|---|---|---|---|---|---|---|---|---|---|
| | Compression Resistance According to DIN 53 421 | | | Abrasion | | | | | |
| Example | In Foaming Direction [N/mm$^2$] | Perpendicular to Foaming Direction [N/mm$^2$] | Cell Characteristics | Resistance After Manual Test+ | Density [g/l] | Shrinkage | Cream Time [sec] | Gel Time [sec] | Rise Time [sec] |
| 33 | 238 | 121 | fine celled | very good | 43 | minimum | 9 | 26 | 45 |
| 34 | 175 | 78 | " | " | 37.6 | " | 9 | 22 | 37 |
| 35 | 208 | 89 (10% compression) | " | " | 37.1 | " | 9 | 19 | 34 |
| 36 | 289 | 117 | " | " | 40.3 | " | 12 | 31 | 58 |
| 37 | 257 | 109 (10% compression) | " | " | 38.3 | " | 11 | 27 | 51 |
| 38 | 199 | 78 | " | " | 33.5 | " | 8 | 23 | 40 |
| 39 | 207 | 94 | " | " | 40.2 | " | 9 | 20 | 33 |
| 40 | 210 | 94 | " | " | 39 | none | 9 | 22 | 45 |
| 41 | 198 | 64 | " | " | 32.2 | minimum | 8 | 30 | 43 |
| 42 | 216 | 95 | " | " | 37.0 | " | 7 | 19 | 35 |
| 43 | 219 | 87 (10% compression) | " | " | 36.7 | " | 9 | 21 | 36 |
| 44 | 324 | 177 | " | " | 38.9 | none | 21 | 62 | 96 |
| 45 | 322 | 131 (10% compression) | " | " | 39.5 | minimum | 23 | 73 | 112 |
| 46 | 337 | 145 (10% compression) | " | " | 39.2 | none | 25 | 63 | 123 |

TABLE 4-continued

|    |              | compression) |    |    |              |         |    |     |     |
|----|--------------|--------------|----|----|--------------|---------|----|-----|-----|
| 47 | 228          | 94           | "  | "  | 36.8         | minimum | 9  | 19  | 37  |
| 48 | 275          | 201          | "  | "  | 40.8         | "       | 11 | 28  | 40  |
| 49 | 248          | 85           | "  | "  | 37.3         | "       | 9  | 22  | 45  |
| 50 | 256          | 170          | "  | "  | 39.8         | "       | 11 | 33  | 54  |
| 51 | 258          | 116          | "  | "  | 32.8         | "       | 11 | 28  | 46  |
| 52 | 229          | 155          | "  | "  | 36.6         | "       | 16 | 38  | 57  |
| 53 | 222          | 78           | "  | "  | 37.1         | slight  | 9  | 23  | 42  |
| 54 | 288          | 112          | "  | "  | 40.9         | "       | 11 | 27  | 47  |
| 55 | 298          | 130 (10%     | "  | "  | 37.9         | "       | 14 | 63  | 116 |
|    |              | compression) |    |    |              |         |    |     |     |
| 56 | 265          | 137          | "  | "  | 38.2         | "       | 9  | 25  | 48  |
| 57 | 307          | 160          | "  | "  | 43.8         | "       | 13 | 35  | 56  |
| 58 | not measured | not measured | "  | "  | 70.0         | none    | 51 | 204 | 285 |
| 59 | "            | "            | "  | "  | not measured | "       | 43 | 172 | 283 |
| 60 | "            | "            | "  | "  | "            | "       | 42 | 160 | 234 |
| 61 | "            | "            | "  | "  | "            | "       | 42 | 182 | 247 |
| 62 | "            | "            | "  | "  | "            | "       | 46 | 154 | 258 |
| 63 | "            | "            | "  | "  | "            | "       | 9  | 36  | 51  |
| 64 | "            | "            | "  | "  | "            | "       | 16 | 48  | 72  |
| 65 | 161          | 90           | "  | "  | "            | "       | 9  | 36  | 78  |

| Example | Cell Characteristics | Abrasion Resistance After Manual Test+ | Shrinkage | Cream Time [sec] | Gel Time [sec] | Rise Time [sec] |
|---------|----------------------|----------------------------------------|-----------|------------------|----------------|-----------------|
| 66 | fine celled | very good | none | 62 | 196 | 276 |
| 67 | "           | "         | "    | 64 | 206 | 308 |
| 68 | "           | "         | "    | 58 | 185 | 293 |
| 69 | "           | "         | "    | 58 | 186 | 264 |
| 70 | "           | "         | "    | 59 | 212 | 290 |
| 71 | "           | "         | "    | 70 | 201 | 306 |
| 72 | "           | "         | "    | 63 | 193 | 270 |
| 73 | "           | "         | "    | 63 | 183 | 262 |
| 74 | "           | "         | "    | 65 | 196 | 276 |

+For the qualitative evaluation of the abrasion resistance, the foam was cut perpendicular to the direction in which the foam rose, and the thumb was run vigorously over the cut surface. The foam behavior was classified as follows:
very good : no abrasion
good : slight abrasion
moderate : marked abrasion
poor : very pronounced abrasion; the foam can be easily pulverized between the fingers contrary to the evaluation of the very good to moderate.

The embodiments of the invention in which an exclusive privilege or property is claimed are defined as follows:

1. A process for the preparation of cellular polymers having urethane groups, isocyanurate groups, or both comprising
reacting an organic polyisocyanate with a polymer dispersion in the presence of a blowing agent and catalyst wherein the polymer dispersion comprises
(a) as a continuous phase, a polyol having a functionality of 2 to 8 and a hydroxyl number of 150 to 700, and
(b) as a disperse phase, an organic compound having
1. at least one Zerewitinoff active hydrogen atom,
2. a melting point of 30° C. to 260° C., and
3. a molecular weight of 178 to 100,000.

2. The process of claim 1 wherein the continuous phase is a polyol which is liquid at 25° C. and is selected from the group consisting of a polyester polyol having a functionality of 2 to 6 and a hydroxyl number of 200 to 700, a polyether polyol having a functionality of 2 to 8 and a hydroxyl number of 150 to 700, and mixtures thereof.

3. The process of claim 1 wherein the dispersed phase is selected from the group consisting of
A. polyester polyols having a molecular weight of 220 to 10,000 and a hydroxyl number of 10 to 500, prepared from aliphatic or aromatic dicarboxylic acids or their mixtures, and bifunctional symmetrical alcohols,
B. oligoamides having a molecular weight of 142 to 5,000, prepared by polycondensation of aliphatic or aromatic dicarboxylic acids with aliphatic primary and/or secondary diamines, in a mole ratio of 1:1.05 to 1:2
C. oligo- or polyester amines having a molecular weight of 400 to 5,000 produced by reaction of aliphatic and/or aromatic diols with aromatic aminocarboxylic acids and possibly aromatic and-/or aliphatic dicarboxylic acids
D. oligo- or polyurethanes having a molecular weight of 280 to 5,000 produced by the polyaddition of organic diisocyanates and aliphatic diols in a mole ratio of 1:1.05 to 1:2,
E. amino- or hydroxyl group-containing polyethers having a molecular weight of 600 to 20,000 of alkylene oxide, cyclohexene oxide, styrene oxide, or tetrahydrofuran,
F. polyacetals or polyacetal copolymers having a molecular weight of 600 to 100,000, and
G. mixtures thereof.

4. The process of claim 1 wherein the organic polyisocyanate is crude MDI.

5. The process of claim 4 wherein the disperse phase is a polyester polyol.

6. The process of claim 1 wherein the organic polyisocyanate is crude MDI, the disperse phase is a polyester polyol, and the continuous phase is a polyether polyol.

7. The process of claim 6 wherein the polyester polyol has a hydroxyl number of 50 to 350.

8. The process of claim 7 wherein the melting point of the polyester polyol is from 50° C. to 175° C.

9. The process of claim 8 wherein the polyester polyol is prepared by reacting a carboxylic acid selected from the group consisting of isophthalic acid, terephthalic acid, succinic acid, glutaric acid, adipic acid, and mixtures thereof, with a glycol selected from the group consisting of neopentyl glycol, ethylene glycol, propylene glycol, and mixtures thereof.

10. The process of claim 9 wherein the carboxylic acid is isophthalic acid and the glycol is a mixture of neopentyl glycol and ethylene glycol.

11. The process of claim 10 wherein the mole ratio of isophthalic acid to neopentyl glycol to ethylene glycol is from 1:1:0.05 to 1:2:0.2.

12. The process of claim 6 wherein the continuous phase is a polyether polyol prepared by reacting an initiator selected from the group consisting of sucrose, glycerine, water, and mixtures thereof, with an alkylene oxide selected from the group consisting of ethylene oxide, propylene oxide, and mixtures thereof.

13. The process of claim 12 wherein the polyether polyol is a mixture consisting of a polyether polyol prepared by reacting sucrose with propylene oxide, a polyether polyol prepared by reacting glycerine with propylene oxide, and a polyether polyol prepared by reacting water with propylene oxide.

14. The process of claim 13 wherein the weight ratio of the sucrose/propylene oxide polyol to glycerine/propylene oxide polyol to water/propylene oxide polyol is from 4:1:0.5 to 2:1:1.

15. The process of claim 1 wherein the organic polyisocyanate and polymer dispersion are reacted in such quantities that the ratio of reactive hydrogen atoms of the polymer dispersion to isocyanate groups is 1:0.8 to 1.0:2.5.

16. The process of claim 15 wherein the organic polyisocyanate and polymer dispersion are reacted in such quantities that the ratio of reactive hydrogen atoms of the polymer dispersion to isocyanate groups is 1:1.

17. The process of claim 1 wherein the amount of the disperse phase in the reaction mixture is from 0.5 to 50 percent by weight relative to the weight of the continuous phase.

18. The process of claim 1 wherein the organic polyisocyanate and polymer dispersion are reacted in such quantities that the ratio of isocyanate groups to the reactive hydrogen atoms of the polymer dispersion is 6:1 to 60:1.

19. The process of claim 1 wherein the organic polyisocyanate and polymer dispersion are reacted in such quantities that the ratio of isocyanate groups to reactive hydrogen atoms of the polymer dispersion is 2:1 to 10:1.

20. A cellular polymer having urethane groups, isocyanate groups, or both prepared by
reacting an organic polyisocyanate with a polymer dispersion in the presence of a blowing agent and catalyst wherein the polymer dispersion comprises
(a) as a continuous phase, a polyol having a functionality of 2 to 8 and a hydroxyl number of 150 to 700, and
(b) as a disperse phase, an organic compound having
1. at least one Zerewitinoff active hydrogen atom,
2. a melting point of 30° C. to 260° C., and
3. a molecular weight of 178 to 100,000.

21. The cellular polymer of claim 20 wherein the continuous phase is a polyol which is liquid at 25° C. and is selected from the group consisting of a polyester polyol having a functionality of 2 to 6 and a hydroxyl number of 200 to 700, a polyether polyol having a functionality of 2 to 8 and a hydroxyl numbr of 150 to 700, and mixtures thereof.

22. The cellular polymer of claim 20 wherein the dispersed phase is selected from the group consisting of
A. polyester polyols having a molecular weight of 220 to 10,000 and a hydroxyl number of 10 to 500, prepared from aliphatic or aromatic dicarboxylic acids or their mixtures, and bifunctional symmetrical alcohols,
B. oligoamides having a molecular weight of 142 to 5,000, prepard by polycondensation of aliphatic or aromatic dicarboxylic acids with aliphatic primary and/or secondary diamines, in a mole ratio of 1:1.05 to 1:2
C. oligo- or polyester amines having a molecular weight of 400 to 5,000 produced by reaction of aliphatic and/or aromatic diols with aromatic aminocarboxylic acids and possibly aromatic and/or aliphatic dicarboxylic acids
D. oligo- or polyurethanes having a molecular weight of 280 and 5,000 produced by the polyaddition of organic diisocyanates and aliphatic diols in a mole ratio of 1:1.05 to 1:2,
E. amino- or hydroxyl group-containing polyethers having a molecular weight of 600 to 20,000 of alkylene oxide, cyclohexene oxide, styrene oxide or tetrahydrofuran,
F. polyacetals or polyacetal copolymers having a molecular weight of 600 to 100,000, and
G. mixtures thereof.

23. The cellular polymer of claim 20 wherein the organic polyisocyanate is crude MDI, the disperse phase is a polyester polyol, and the continuous phase is a polyether polyol.

* * * * *

UNITED STATES PATENT AND TRADEMARK OFFICE
CERTIFICATE OF CORRECTION

PATENT NO. : 4,302,551

DATED : November 24, 1981

INVENTOR(S) : Peter Horn, Anton Hesse, Peter Weyland,
Wolfgang Straehle, Matthias Marx It is certified that error appears in the above—identified patent and that said Letters Patent is hereby corrected as shown below:

Column 22, Claim 20, line 1, change isocyanate to "isocyanurate".

Signed and Sealed this

Ninth Day of February 1982

[SEAL]

Attest:

Attesting Officer

GERALD J. MOSSINGHOFF

Commissioner of Patents and Trademarks